Patented July 12, 1949

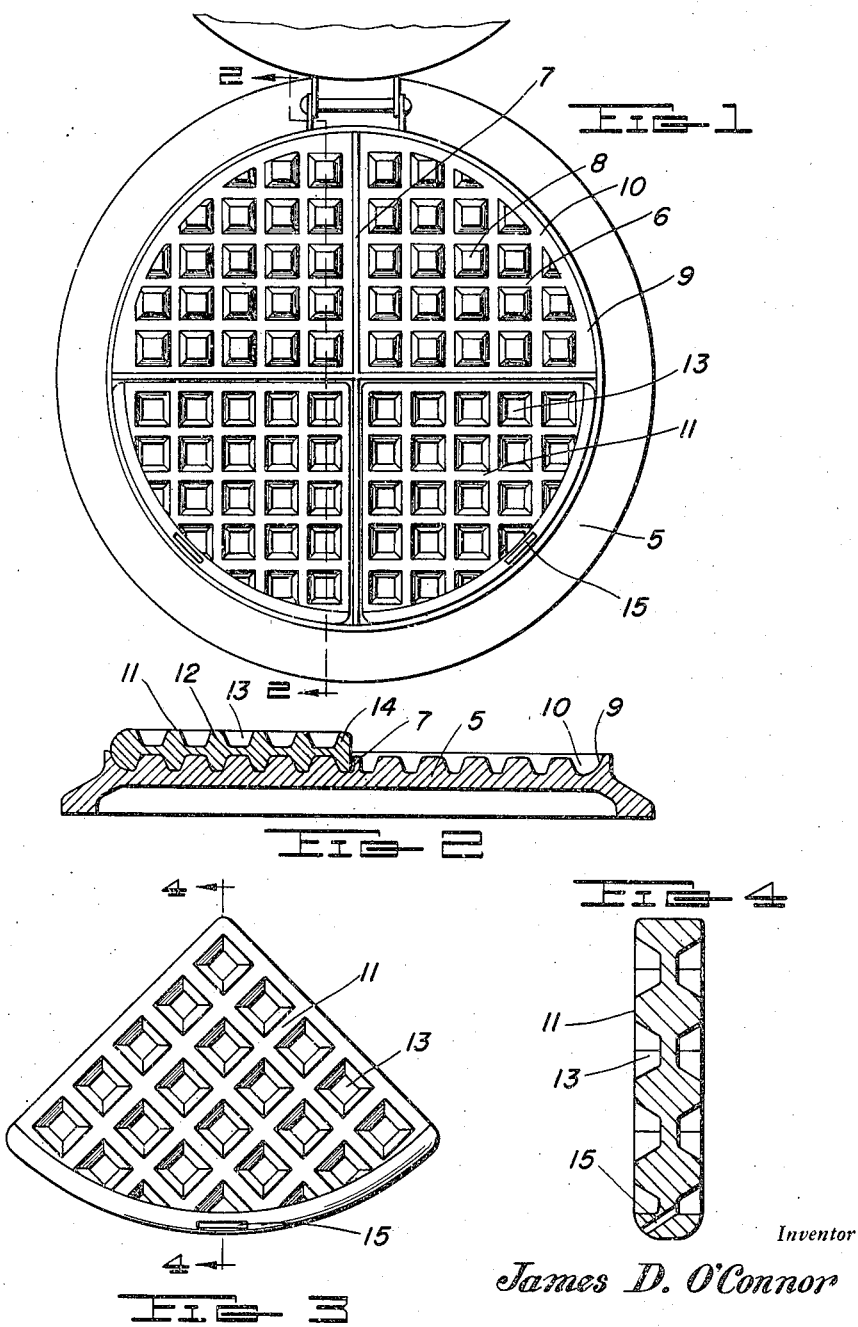

2,476,213

UNITED STATES PATENT OFFICE 2,476,213

REMOVABLE SEGMENT FOR WAFFLE IRONS

James D. O'Connor, Hartford, Conn.

Application September 19, 1945, Serial No. 617,282

2 Claims. (Cl. 99—376)

The present invention relates to new and useful improvements in waffle irons, and more particularly to a removable segment adapted for placing in the iron and by means of which a predetermined portion of the waffle iron may be blocked off to enable use of the waffle iron in making portions of a waffle less than a whole waffle, and thus enable a saving of batter where less than a whole waffle is desired.

An important object of the present invention is to provide a removable segment of this character for waffle irons and adapted for fitting in a desired position on the waffle iron, and which, at the same time, is simple and practical in construction, efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like reference numerals refer to like parts throughout, and in which:

Figure 1 is a top plan view of the bottom section of a waffle iron showing a pair of the removable segments in position thereon, Figure 2 is a sectional view taken substantially on the line 2—2 of Figure 1, Figure 3 is a plan view of one of the removable segments, and Figure 4 is a sectional view taken on the line 4—4 of Figure 3.

Referring now to the drawing in detail, wherein, for the purpose of illustration, I have disclosed a preferred embodiment of the invention, the numeral 5 designates the bottom section of a conventional form of waffle iron and which may be provided with electric heating units (not shown) or designed for heating in any other suitable manner.

The grill portion 6 of the iron is of conventional construction and includes the radially extending dividers 7 which separate the grill into four segments, each provided with the grill recesses and projections indicated at 8.

The edge of the grill is formed with an annular rib 9, the projections and recesses 8 being spaced from the separator 7 and rib 9 to form channels 10 therebetween.

When it is desired to make a waffle of a size less than the whole, a removable segment 11 is provided and which corresponds in size and shape to one of the segments of the grill 6 of the waffle iron, the removable segment 11 being constructed of light weight metal or other suitable material and is also formed with the projections 12 and recesses 13 corresponding to the projections and recesses of the waffle iron for interfitting engagement therewith, as indicated in Figure 2 of the drawing. The edges of the segment 11 are also formed with upwardly and downwardly projecting ribs 14 adapted to seat in the grooves 10 adjacent the separators 7 and rib 9 of the waffle iron to thus block off an entire segment of the waffle iron and prevent the batter from entering such blocked off segment.

One or more of the segments 11 may be placed in use in accordance with the size of the waffle to be made.

In order to facilitate removal of the segment 11 from the waffle iron, I provide a slot 15 in the outer rib of the segment, the slot being inclined inwardly, as indicated in Figure 4 of the drawing, and adapted to receive a kitchen or table fork to enable the lifting of the segment from the waffle iron.

In view of the foregoing description taken in conjunction with the accompanying drawings, it is believed that a clear understanding of the construction, operation and advantages of the device will be quite apparent to those skilled in this art. A more detailed description is accordingly unnecessary.

It is to be understood, however, that even though I have herein shown and described a preferred embodiment of my invention that the same is susceptible to certain changes fully comprehended by the spirit of the invention as herein described and the scope of the appended claims.

What I claim is:

1. In a waffle iron having hingedly connected top and bottom members divided into segmental sections mating in pairs with interfitting projections and recesses therein, a solid segmental insert fitting between any pair of said mating sections, selectively, to block off a selected pair while leaving the other pairs available for cooking part of a waffle therein, said insert having projections and recesses on both sides thereof adapting the same to interfit with the projections and recesses of the blocked-off section of said iron.

2. In a waffle iron having a bottom member and a top member hinged to the bottom member to swing down on the same and close said iron, said members being divided into segmental sections mating in pairs with interfitting projections and recesses therein, a segmental insert fitting between any pair of said mating sections, selectively, to block off a selected pair while leaving the other pairs available for cooking part of a waffle therein, said insert being constructed and arranged to permit the top member to be swung down to close said iron.

JAMES D. O'CONNOR.

REFERENCES CITED

The following references are of record in the file of this patent:

UNITED STATES PATENTS

| Number | Name | Date |
|---|---|---|
| 1,947,124 | Clauss | Feb. 13, 1934 |

FOREIGN PATENTS

| Number | Country | Date |
|---|---|---|
| 224,904 | Great Britain | June 11, 1925 |